July 23, 1968          R. E. LAWRENCE          3,393,829
SPLIT SHOT DISPENSER
Filed June 7, 1967

INVENTOR
RALPH E. LAWRENCE
BY Lothrop & West
ATTORNEYS

United States Patent Office 3,393,829
Patented July 23, 1968

3,393,829
SPLIT SHOT DISPENSER
Ralph E. Lawrence, 2485 28th Ave.,
Sacramento, Calif. 95822
Filed June 7, 1967, Ser. No. 644,357
4 Claims. (Cl. 221—88)

ABSTRACT OF THE DISCLOSURE

A circular peripherally flanged disc of resilient material has a radially outwardly opening V-shaped groove formed therein. A plurality of outwardly opening recesses in the flange releasably holds split lead shots with V-shaped notches aligned with the groove. A portion of a fishing line is wrapped partially around the flange periphery with the line located in the groove and in the aligned notches. Pliers laterally crimp the flexible flange walls adjacent the selected shot, thereby closing the notch over the line. The line and attached shot are thereupon pulled away, the walls of the recess flexing to release the shot.

---

The invention relates to improvements to split shot dispensers.

The market place as well as the patent literature are replete with devices for dispensing small sinkers for attachment to a fishing line. Inclusive of such prior art is Peters, Patent No. 2,791,925, dated May 14, 1957.

So far as is known, however, none of the prior art patents teaches an arrangement of notched spherical shots lodged within their own individual recesses and positively confined by overhanging ledges capable of yielding to release a preselected shot secured to a fishing line by crimping the side walls of the recess.

It is therefore an object of the invention to provide a split shot dispenser which is not only economical, in that cheap and widely available spherical shots can be used with the device, but which is also convenient and reliable in that the individual shots, while normally securely held in place, can readily be clamped to the fishing line at the desired position and easily withdrawn, ready for use.

It is another object of the invention to provide a generally improved split shot dispenser.

Other objects, together with the foregoing, are attained in the embodiment described in the following description and shown in the accompanying drawing in which.

Figure 1:
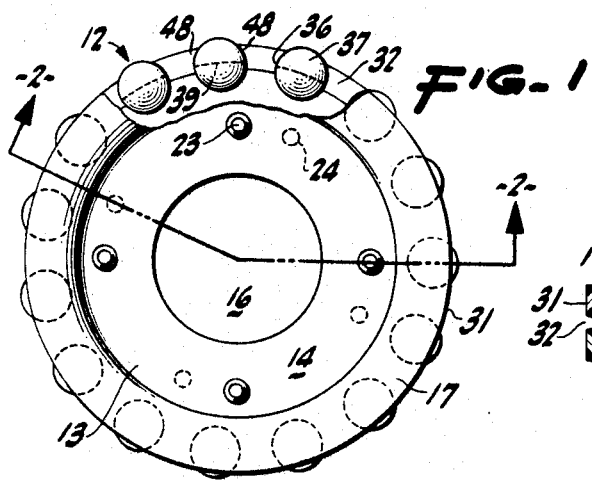
FIGURE 1 is a plan view, a portion being broken away to reveal interior details.

While the split shot dispenser of the invention, generally designated by the reference numeral 12, is susceptible of numerous physical embodiments, depending upon the environment and the requirements of use, substantial numbers of the herein shown and described embodiment have been made and used, and all have performed in an eminently satisfactory manner.

In its preferred embodiment the dispenser 12 comprises a circular disc 13 molded from a moderately resilient plastic material. The disc 13 includes a circular web portion 14 having a circular, central opening 16 and carrying around its periphery an enlarged flange member 17.

Figure 2:
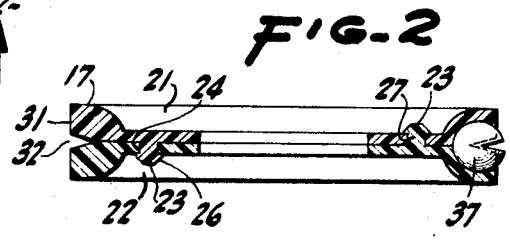
FIGURE 2 is a transverse sectional view, the compound planes of the section being indicated by the line 2—2 in FIGURE 1.

For production purposes, the body of the dispenser is molded in two halves 21 and 22 arranged in mirror symmetry, as appears most clearly in FIGURE 2.

The two halves are later secured together in face to face engagement, as will be explained, by mating together four complementing pairs of snap buttons 23 and registering apertures 24 on each of the halves. In other words, the half 21 carries four buttons 23 projecting through four registering apertures 24 in the half 22, and vice versa.

The buttons 23 each include a tapered head 26 capable of temporarily distending the walls of the corresponding aperture 24 as the button is forcibly urged therethrough. After the head clears the aperture, the aperture walls return to their original position and snugly encompass the button shank 27, the annular shoulder below the button head being effective to prevent subsequent separation between the mating halves.

Each of the flange halves is so molded that after mating is effected the outer periphery 31 of the flange 17 is formed with a peripheral groove 32 which is V-shaped in transverse section (see FIGURE 2).

So, also, the flange halves are formed in such a manner that after being joined they together afford a plurality of recesses 36 arranged to receive a plurality of split, lead shots 37 of generally spherical configuration, each of the shots having formed therein a V-shaped notch 38. The notches 38 are aligned with the peripheral V-shaped groove 32, although preferably the bottom 39 of the notch 38 is slightly above the bottom 41 of the groove 32 (see FIGURE 5).

Figure 4:
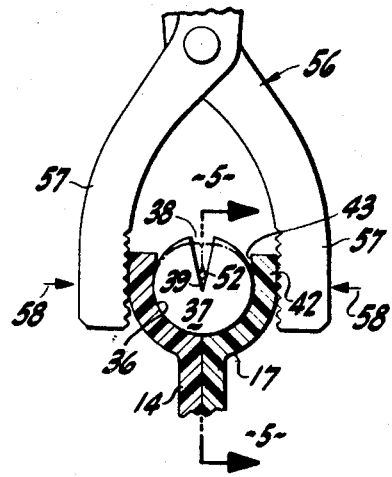
FIGURE 4 is a fragmentary sectional view, to an enlarged scale, showing the crimping operation, the plane of the section being indicated by the line 4—4 in FIGURE 3; and, FIGURE 5 is a fragmentary sectional view to an enlarged scale, the plane of the section being indicated by the line 5—5 in FIGURE 4.

Each of the recesses 36 is, when viewed in median transverse section, as in FIGURE 4, substantially U-shaped. That is to say, the walls 42 of the flange 17 are in a bifurcated arrangement and the innermost, or facing, wall surfaces 43 are arcuate at the bottom and extend upwardly, as in FIGURE 4, in a substantially vertical attitude.

Figure 5:
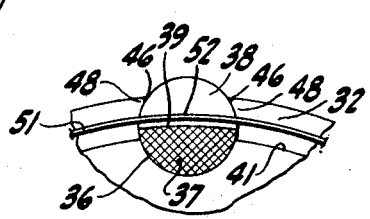

When the recesses 36 are viewed in plan, however, as appears most clearly in FIGURES 1 and 5, the recess, or cavity, walls are generally circular in configuration, possessing substantially the same radius of curvature as the split shot. The cavity walls form a segment of a circle which is approximately 250° in arc, thus exposing about 110° of the shot which, accordingly, projects outwardly from the recess opening 46 by an amount sufficient to enable the user to see and feel which shots still remain (see FIGURE 3).

Each cavity opening 46, or mouth, is defined on each side wall 42 by an opposed, facing pair of ledges 48 which overhangs the shot above the shot's central horizontal plane, this plane being substantially coincident with the bottom 39 of the V-notch 38. The ledges 48, in other words, normally serve to confine the shot in a secure fashion. Yet, since the ledges are of a somewhat resilient material, they can be flexed when the ball is urged outwardly with sufficient force, as will subsequently be explained in detail.

Before proceeding with the operation of the device, however, it is believed appropriate to indicate the manner in which the dispenser is assembled. As previously stated, the two halves are molded, each of the halves being formed in mirror symmetry. Prior to engaging the two halves, an array of one of the halves is located face up in a shot loading fixture forming no part of the present invention. While so disposed in the shot loading fixture, a plurality of shots is released above the exposed, lower cavity halves, the shots finding their way into the exposed cavity halves by gravity and coming to rest therein. The shots at this juncture are entirely spherical; they do not have notches in them.

After the cavities in the lower disc halves are filled, the mating upper halves of the discs are properly oriented and registered with respect to the lower halves containing the shots. Then the two halves are urged together so that the snap buttons enter their corresponding apertures and interengage the two halves, as previously explained and as shown most clearly in FIGURE 2. This is followed by placing each of the dispensers in a suitable apparatus which rotates the dispenser, a knife edge being concurrently urged tangentially against the exposed portion of each of the shots and thereby cutting the V-notches therein.

Figure 3:
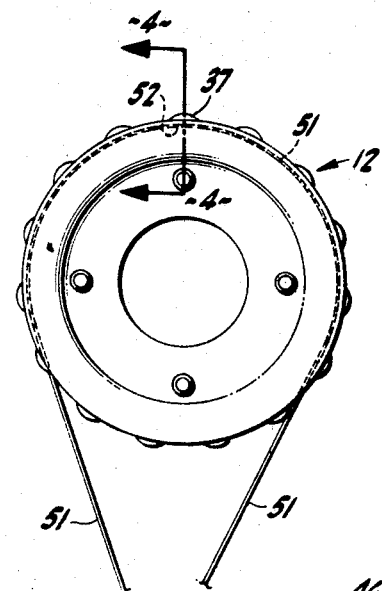
FIGURE 3 is a plan view to a reduced scale illustrating the manner in which a fishing line is partially wrapped around the dispenser preparatory to crimping one or more of the split shots to the line.

The preferred manner of using the dispenser is as indicated in FIGURES 3–5. Ordinarily, a fisherman knows precisely where a particular shot, or several shots, are to be located on the fishing line 51.

Assuming it is desired to locate one of the shots 37 on the line portion 52 (see FIGURES 3 and 5), the fishing line is first partially wrapped around the periphery of the flange with the line disposed, as shown in the bottom of the peripheral, V-shaped groove 32 and with the selected line portion 52 lying in the bottom 39 of the V-shaped notch 38 of desired shot 37.

Most fishermen find it convenient to orient the dispenser relative to the line approximately as shown in FIGURE 3, holding the disc between the thumb and first two fingers while holding the exposed ends of the line 51 between the last two fingers and the base of the palm of the hand, concurrently exerting a slight tautening force on the two ends of the line maintain the curved portion of the line in the groove 32 and the notches 38.

Then, with a pair of pliers 56 located so that the plier jaws 57 straddle the cavity walls transversely, as in FIGURE 4, the plier handles are squeezed so as to force the jaws together in the direction of the arrows 58.

This opposed force, acting through the yielding walls 42 of the cavity 36, closes the notch 38 in the manner indicated in broken line in FIGURE 4 and thereby clamps the shot to the line.

If more than one shot is desired, the fisherman need only repeat this process the desired number of times on the shot, or shots, adjacent the initial one chosen. This can usually be effected without having to shift the line, it being only necessary to move and squeeze the plier jaws at each of the shots selected.

At this juncture, the disc is gripped by one hand, the other hand holding at least one end of the line 51. Then, pulling outwardly on the line in a direction away from the crimped shots, the shots attached to the line are dislodged from their respective cavities. As previously explained, while the retaining ledges 48 are quite adequate to hold the shots normally in their recesses, the ledges are sufficiently resilient to be flexed outwardly as the shot is urged outwardly through the cavity mouth 46, the supervening force exerted by the pull on the line being sufficient to effect this result.

It can therefore be seen that I have provided a split shot dispenser which is not only economical, but which also affords a rapid and convenient way in which to attach one or more of such sinkers to a fishing line even in the dark and under unfavorable weather conditions, the exposed portions of the available shots serving to reveal their presence in a tactile as well as visual manner.

What is claimed is:
1. A split shot dispenser comprising:
   (a) a circular disc including an enlarged peripheral flange of yieldable material, said flange having formed therein a peripheral V-shaped groove diverging radially outwardly in transverse cross-section, and a plurality of radially outwardly-opening, spaced, peripheral recesses, the walls of each of said recesses being substantially U-shaped in transverse section and defining in plan a circular segment having an arc in excess of 180° to afford adjacent the openings of said recesses, pairs of facing opposed overhanging ledges; and,
   (b) a plurality of split lead shots lodged within said recesses, each of said shots having a V-shaped notch formed therein in alignment with said peripheral V-shaped groove in said flange, at least a portion of each of said split shots normally being confined by said overhanging ledges, each of said shots being capable of being transversely deformed to engage a fishing line disposed in the bottom of said notch and of flexing said overhanging ledges to release said shot as the fishing line portion attached to said shot is moved substantially radially outwardly away from said recess confining said shot and carrying said shot therewith.

2. A device as in claim 1 wherein the outermost portions of said shots extend outwardly beyond the periphery of said flange.

3. A device as in claim 2 wherein said flanged disc is fabricated from a pair of halves arranged in mirror symmetry and secured together in face to face engagement.

4. A device as in claim 3 wherein each of said halves is joined to the other by complementary pairs of mating snap buttons and apertures, said buttons each including a shank and a tapered head, each of said heads being larger in size than the corresponding one of said apertures, the walls of said apertures being temporarily deformed as said heads are urged therethrough, said walls thereafter resuming normal size to encompass said shanks in snug relation, said heads being thereafter effective to prevent separation of said halves of said flanged disc.

References Cited
UNITED STATES PATENTS

| | | | |
|---|---|---|---|
| 1,619,294 | 3/1927 | Culter | 221—88 |
| 2,791,925 | 5/1957 | Peters | 29—243.57 |
| 2,803,977 | 8/1957 | Surratt | 29—212 |

WALTER SOBIN, *Primary Examiner.*